(No Model.) 2 Sheets—Sheet 1.

R. C. BORCHERS.
FRICTION DEVICE.

No. 483,892. Patented Oct. 4, 1892.

WITNESSES:
J. F. Stuckert
Jno. R. Davis

INVENTOR,
Richard C. Borchers.

(No Model.) 2 Sheets—Sheet 2.
R. C. BORCHERS.
FRICTION DEVICE.
No. 483,892. Patented Oct. 4, 1892.
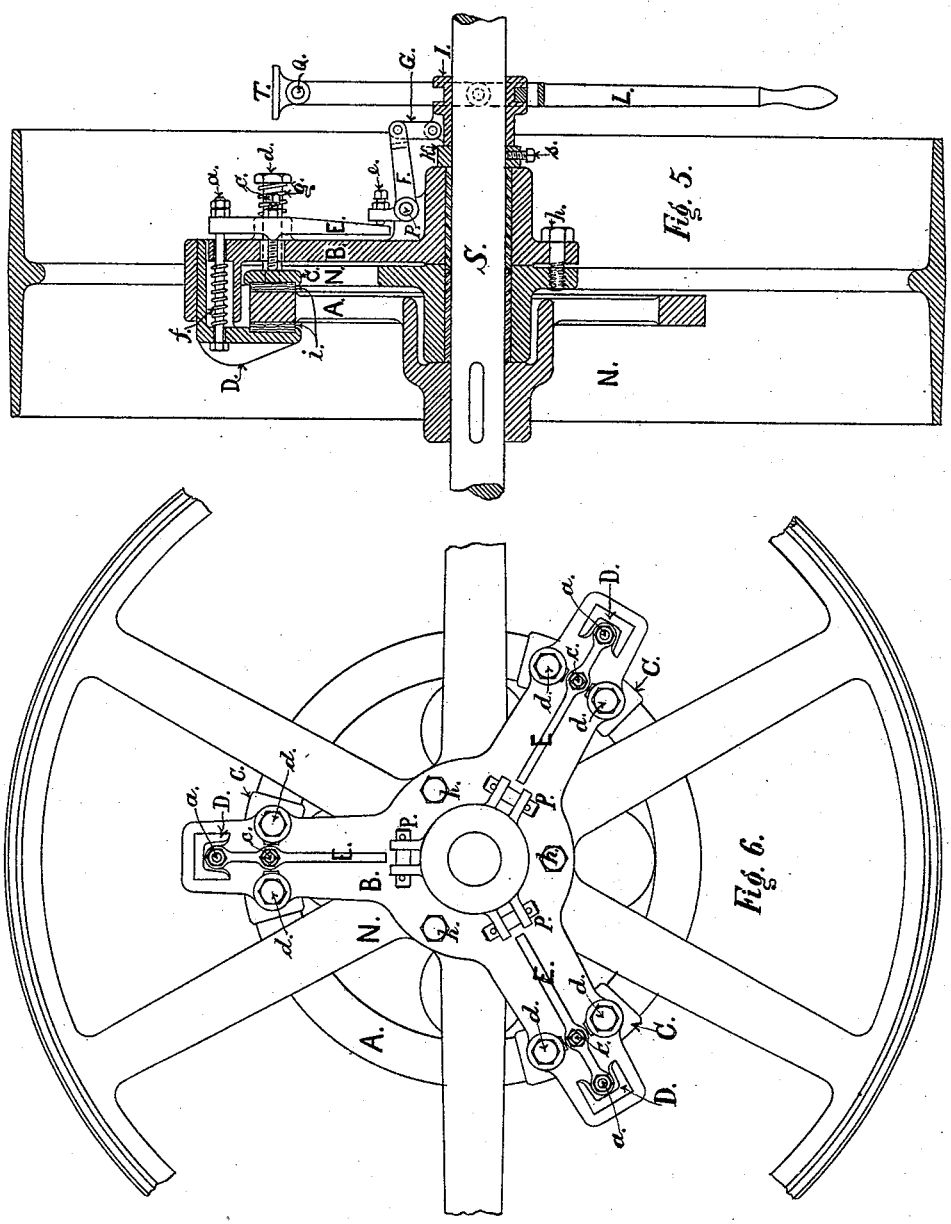
WITNESSES:
INVENTOR.
Richard C. Borchers

UNITED STATES PATENT OFFICE.

RICHARD C. BORCHERS, OF PHILADELPHIA, PENNSYLVANIA.

FRICTION DEVICE.

SPECIFICATION forming part of Letters Patent No. 483,892, dated October 4, 1892.

Application filed September 29, 1891. Serial No. 407,166. (No model.)

*To all whom it may concern:*

Be it known that I, RICHARD C. BORCHERS, of the city of Philadelphia and State of Pennsylvania, have invented a new and useful Friction Device, of which the following is a specification.

My invention relates to such kinds of friction devices by means of which a revolving piece of machinery might be gradually started or suddenly stopped while the part from which the motion is transmitted will be kept revolving at the same speed. The device might, therefore, be used in place of a clutch-coupling, a pair of tight and loose pulleys, and a loose pulley, rope-wheel, gear-wheel, or chain-wheel with clutch.

Figure 1:
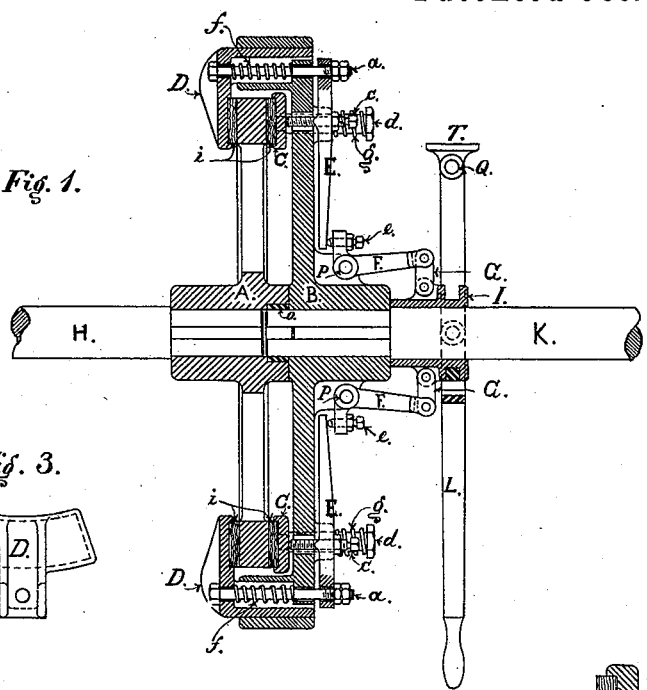
Figure 3:
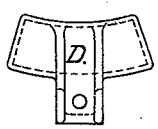
Figure 4:
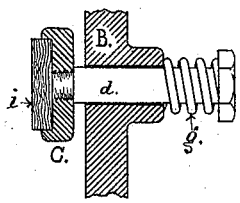
Figure 2:
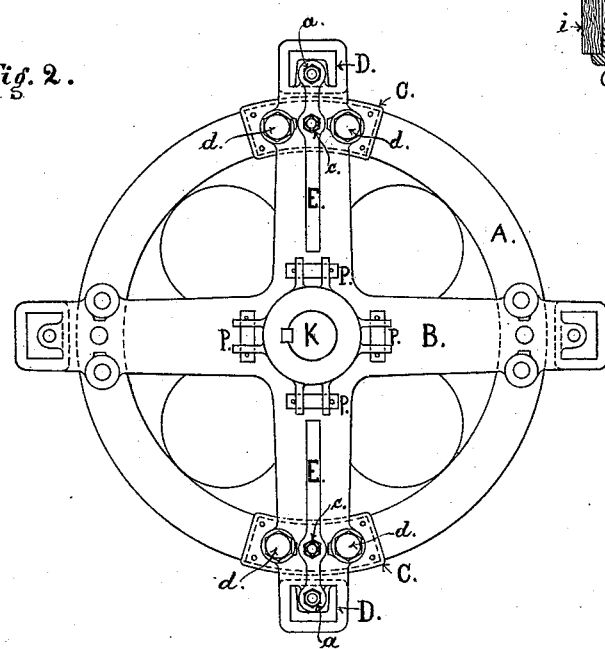

In the accompanying drawings, Figure 1 is a section through the device when used as a clutch-coupling. Fig. 2 is an end view of the same with some of the parts removed. Figs. 3 and 4 show some of the details of construction. Fig 5 is a section through the device when used in connection with a pulley; but the place of the pulley might be exchanged for a rope-wheel, gear-wheel, or chain-wheel and therefore when the word "pulley" occurs hereinafter it also implies "rope-wheel," "gear-wheel," or "chain-wheel." Fig. 6 is an end view, partly broken away, of the device, as shown in Fig. 5.

Similar letters refer to similar parts all through the different views.

When used as a clutch-coupling, shaft H is supposed to be the driver and shaft K the driven one. On the reduced end of the shaft H is keyed the friction-wheel A, whose hub projects over the end of the shaft H and contains the bush $o$, into which extends the end of the shaft K in order to keep the two shafts central with each other. On the reduced end of the shaft K is keyed the spider B. This spider B consists of two or more arms running radial from the same hub, having at the outer end a square pocket, into which fits the tail-piece of the hooked friction-shoes D, of which Fig. 3 gives a face view. These shoes D can slide in their respective pockets back and forth parallel to the axes of the two shafts H and K and are kept in position and connected with the end of the levers E by the bolts $a$. These bolts $a$ act as guides for the springs $f$, which have the tendency to push the shoes D away from the arms of the spider B. The levers E have no fixed point of fulcrum, but the point of the set-screw $c$, which projects through a corresponding hole in the arms of the spider B and presses against the plain shoes C, forms the fulcrum of the lever at the time when the friction-block of the shoe C comes in contact with the friction-wheel A, while the bolts $a$ form the fulcrum for said levers E when the shoes C are pulled by the springs $g$ away from the friction-wheel A. Therefore the levers E are swinging levers with movable and changeable points of fulcrum. The plain shoes C are each kept in position and guided by two studs $d$. These studs $d$ can slide back and forth in corresponding holes in the arms of the spider B, which are thickened correspondingly at these places by two lugs to form a longer guide for the studs $d$ and at the same time by a small projection between each other to form a guide for the levers E. Each of the studs $d$ carries, also, a spring $g$, which have a tendency to pull the shoes C toward the arms of the spider. The shoes D and C each carry a friction-block $i$, between which runs the rim of the friction-wheel.

A, Fig. 4, shows the stud $d$ with the spring $g$, the shoe C, and the friction-block $i$ with the thickened part of the arms of the spider B on a larger scale. The levers E lie central to the arms of the spider B and vertical to the axis of the shafts H and K. Near the hub of the spider B, central to each arm, are formed pockets into which fit the bell-crank levers F, rocking on the pins P. The shorter ends of these bell-crank levers F have a set-screw $e$, which presses against the end of the levers E. The longer ends of the bell-crank levers F are connected to the sliding sleeve I by means of two pins and the toggle-piece G. The sliding sleeve I is moved on the shaft K by the lever L, which is fastened at Q to the fulcrum-stand T. It is apparent that if the sliding sleeve I is pushed with the lever L against the hub of the spider B the set-screws $e$ will press against the ends of the levers E and the set-screws $c$ will push the shoes C tight against the rim of the friction-wheel A. At the same time the point of the set-screws $c$ will become the fulcrum for the levers E, and the shoes D will by means of the bolts $a$ be pulled tight against the other side of the rim of the friction-wheel A, thus forcing the spider B and the shaft K to revolve with the friction-wheel A and the shaft H. Whereas if the sliding sleeve I is pulled with the lever L away from the hub of the spider B the screws $e$ will relax the pressure against the ends of the levers E and the springs $g$ and $f$ will force the shoes D and C apart and allow the friction-wheel A with the shaft H to revolve independently of the spider B with the shaft K.

When the device is used in connection with a pulley N, as shown in Figs. 5 and 6, the friction-wheel A is keyed on a revolving shaft S on one side of the arms of the pulley N, while the spider B is fastened on the other side to the arms of the pulley N by the screws $h$ in such relative position that the pockets, with the shoes D, in the arms of the spider B come exactly central and opposite to a space between the arms of the pulley N, as shown in Fig. 6. The pulley N and the spider B have only hubs on one side and are bushed. The bush of the one projects into the other, thus forming a guide to keep them central.

In order to get sufficient bearing for the pulley N with the spider B on the shaft S, the hub of the pulley N projects into the hub of the friction-wheel A, and is on that side kept in position by the same, whereas the collar $k$, which is held on the shaft S by means of a set-screw $s$, forms the guide for the pulley N and spider B on the other side. The sliding sleeve I is also on the opposite side of the arms of the pulley N from that where the friction-wheel A is.

All other details of the friction device when in connection with a pulley are the same as described before when used as a clutch-coupling.

It is apparent that when the sliding sleeve I, Fig. 5, is pushed by the lever L against the collar $k$ the shoes C and D will clamp the friction-wheel A and force the pulley N and the spider B to revolve with the friction-wheel A and the shaft S, whereas if the sliding sleeve J is pulled by the lever L away from the collar $k$ the pulley N, with the spider B and all the levers and the sliding sleeve I, will stand still, while the friction-wheel A, with the shaft S, will keep on revolving.

I claim as my invention and desire to secure by Letters Patent—

1. The combination of the friction-wheel, the spider, the clamping-shoes on opposite sides of said friction-wheel, and operating devices for each pair of clamping-shoes, said devices comprising a lever having at the outer end a rod connected to one of the shoes and at a point some distance from the outer end a pin passing through the spider and bearing upon the other shoe, and means for operating said lever, substantially as specified.

2. The combination of the friction-wheel, the spider, and the clamping-shoes located on opposite sides of the friction-wheel and each guided on the spider, and operating devices for each pair of shoes, said devices comprising a lever having at the outer end a rod connected to the shoe on one side of the friction-wheel and some distance from the outer end a pin projecting through the spider and bearing upon the other shoe, means for operating said lever, and springs for pressing the shoes away from the friction-wheel when said operating-lever is released from pressure, substantially as specified.

3. The combination of a shaft, a wheel or pulley loose thereon, a friction-wheel keyed to the shaft, a spider secured to the wheel or pulley and having arms in line with spaces between the spokes of the said pulley, clamping-shoes on opposite sides of the friction-wheel, and means for operating each pair of said shoes, said means comprising a lever having at the outer end a rod connected to one of the shoes and some distance from the outer end a pin projecting through an opening in the spider and bearing upon the other shoe, and means for operating said lever, substantially as specified.

RICHARD C. BORCHERS.

Witnesses:
J. F. STUCKERT,
JNO. R. DAVIS.